United States Patent
Stoner et al.

(10) Patent No.: US 8,596,404 B1
(45) Date of Patent: Dec. 3, 2013

(54) COMMISSIONING A HYBRID DRIVE ASSEMBLY OF A VEHICLE

(75) Inventors: Michael Anthony Stoner, Eden Prairie, MN (US); Robert Leslie Issacs, Buffalo, MN (US); Vincent Joseph Duray, Edina, MN (US)

(73) Assignee: Eaton Corporation, Cleveland, OH (US)

( * ) Notice: Subject to any disclaimer, the term of this patent is extended or adjusted under 35 U.S.C. 154(b) by 241 days.

(21) Appl. No.: 12/976,661

(22) Filed: Dec. 22, 2010

(51) Int. Cl.
*B60K 17/00* (2006.01)
*B60K 6/00* (2007.10)
*F16D 31/02* (2006.01)

(52) U.S. Cl.
USPC .............. 180/307; 180/165; 180/305; 60/413

(58) Field of Classification Search
USPC ............. 180/165, 305, 307; 417/237; 60/413, 60/485
See application file for complete search history.

(56) References Cited

U.S. PATENT DOCUMENTS

| | | | |
|---|---|---|---|
| 3,892,283 A | 7/1975 | Johnson | |
| 4,098,144 A * | 7/1978 | Besel et al. | 74/661 |
| 4,348,863 A | 9/1982 | Taylor et al. | |
| 4,351,409 A | 9/1982 | Malik | |
| 5,495,912 A | 3/1996 | Gray, Jr. et al. | |
| 6,719,080 B1 * | 4/2004 | Gray, Jr. | 180/165 |
| 6,971,232 B2 * | 12/2005 | Singh | 60/414 |
| 7,076,946 B2 * | 7/2006 | Swartzer et al. | 60/414 |
| 7,147,078 B2 | 12/2006 | Teslak et al. | |
| 7,281,376 B2 | 10/2007 | O'Brien, II | |
| 7,537,075 B2 * | 5/2009 | Gray et al. | 180/165 |
| 7,856,816 B2 * | 12/2010 | Duray | 60/414 |
| 8,043,183 B2 * | 10/2011 | Mueller et al. | 475/83 |
| 8,196,397 B2 * | 6/2012 | Kadlicko | 60/414 |
| 8,302,720 B2 * | 11/2012 | Rose et al. | 180/167 |
| 2003/0180157 A1 * | 9/2003 | Rush | 417/269 |
| 2003/0180158 A1 * | 9/2003 | Rush | 417/269 |
| 2004/0001763 A1 * | 1/2004 | Rush | 417/269 |
| 2004/0251067 A1 * | 12/2004 | Gray et al. | 180/165 |

\* cited by examiner

*Primary Examiner* — J. Allen Shriver, II
*Assistant Examiner* — James M Dolak
(74) *Attorney, Agent, or Firm* — Merchant & Gould P.C.

(57) ABSTRACT

A method for commissioning a hybrid vehicle includes providing a vehicle having a chassis, a first power source disposed on the chassis and a second power source disposed on the chassis. The first power source includes a prime mover and a transmission. The prime mover is selectively engaged to a driveline of the vehicle. The second power source includes a pump/motor assembly, a fluid reservoir in fluid communication with the pump/motor assembly and an energy storage unit in fluid communication with the pump/motor assembly. A neutral position of the pump/motor assembly is determined. The pump/motor assembly of the second power source is coupled to the prime mover of the first power source during pumping mode of the pump/motor assembly. Gas is purged from the second power source by routing fluid from the energy storage unit to the fluid reservoir.

16 Claims, 8 Drawing Sheets

COMMISSIONING A HYBRID DRIVE ASSEMBLY OF A VEHICLE

BACKGROUND

On-highway and off-highway hybrid vehicles are vehicles that include multiple power sources. In one example, the hybrid vehicle may use a conventional gas powered engine to propel the vehicle in one mode of operation and an electric motor to propel the vehicle in another mode of operation. In another example, the hybrid vehicle may use a conventional gas powered engine to propel the vehicle in one mode of operation and a fluid motor to propel the vehicle in another mode of operation. As a result of the multiple power sources, hybrid vehicles provide cost efficient operation.

SUMMARY

An aspect of the present disclosure relates to a method for commissioning a hybrid vehicle. The method includes providing a vehicle having a chassis, a first power source disposed on the chassis and a second power source disposed on the chassis. The first power source includes a prime mover and a transmission. The prime mover is selectively engaged to a driveline of the vehicle. The second power source includes a pump/motor assembly, a fluid reservoir in fluid communication with the pump/motor assembly and an energy storage unit in fluid communication with the pump/motor assembly. A neutral position of the pump/motor assembly is determined. The pump/motor assembly of the second power source is coupled to the prime mover of the first power source during pumping mode of the pump/motor assembly. Gas is purged from the second power source by routing fluid from the energy storage unit to the fluid reservoir.

Another aspect of the present disclosure relates to a method for commissioning a hybrid vehicle. The method includes providing a vehicle having a chassis, a first power source disposed on the chassis and a second power source disposed on the chassis. The first power source includes a prime mover and a transmission. The prime mover is selectively engaged to a driveline of the vehicle. The second power source includes a pump/motor assembly having a pump/motor unit with a variable swashplate, a fluid reservoir in fluid communication with the pump/motor assembly and an energy storage unit in fluid communication with the pump/motor assembly. A neutral position of the pump/motor unit is determined. The pump/motor unit of the second power source is coupled to the prime mover of the first power source during pumping mode of the pump/motor unit. The neutral position determination includes actuating the pump/motor unit from pumping mode to motoring mode. A signal from a neutral position sensor, which is in fluid communication with the pump/motor unit, is monitored. The signal is recorded when the signal crosses a threshold value. The pump/motor unit is actuated from motoring mode to pumping mode. The signal from the neutral pressure sensor is monitored. The signal is recorded when the signal crosses the threshold value. The neutral position of the pump/motor unit corresponds to an average of the recorded signals.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
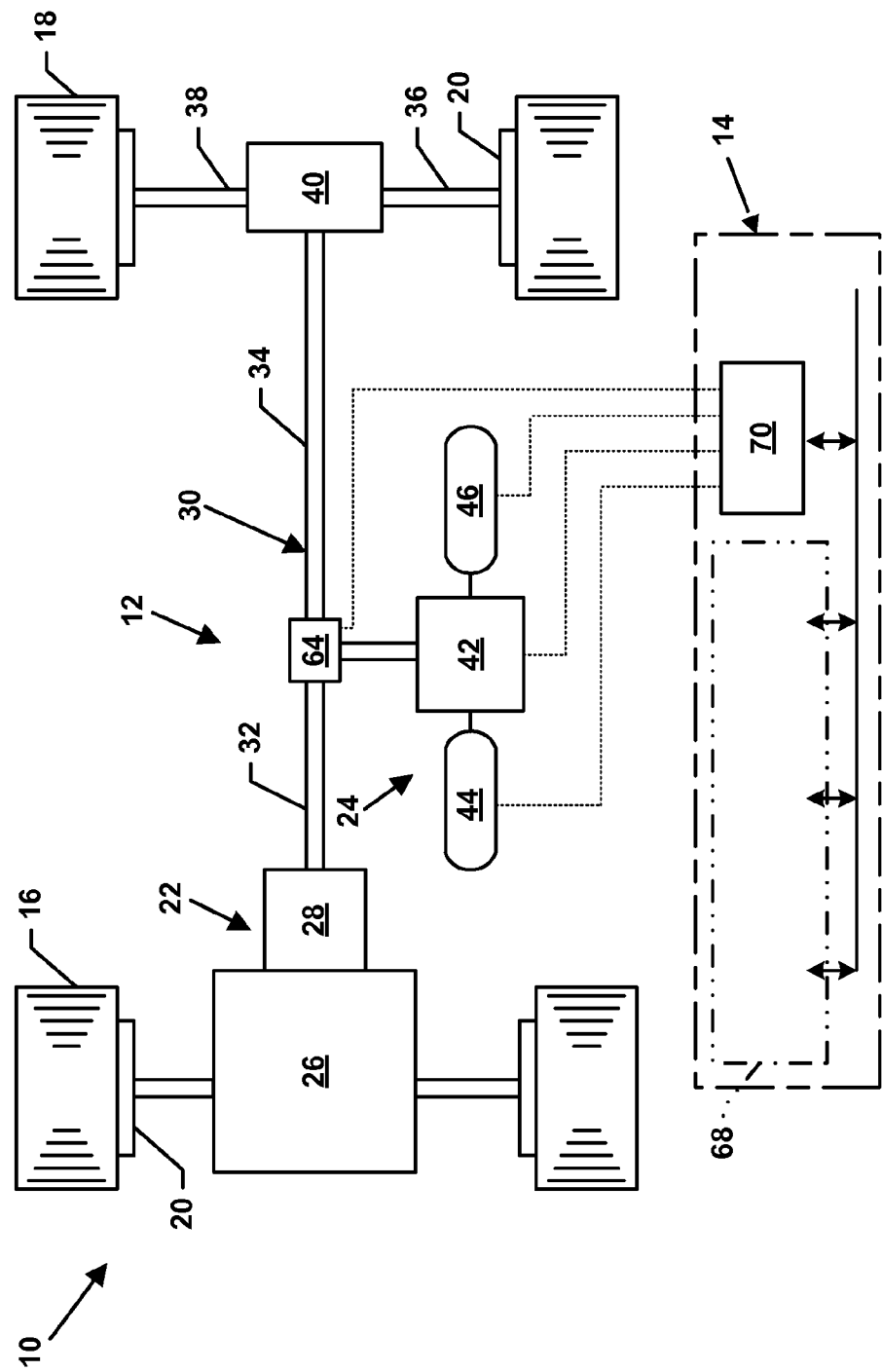
FIG. 1 is a schematic representation of a drive system of a hybrid vehicle having features that are examples of aspects in accordance with the principles of the present disclosure.

Referring now to FIG. 1, a schematic representation of a drive system 10 of a vehicle 11 is shown. In one aspect of the present disclosure, the drive system 10 is suitable for use in an on-highway vehicle, such as a truck, a refuse truck, a bus, or an automobile, or an off-highway vehicle, such as construction and agriculture vehicles.

In the depicted example of FIG. 1, the drive system 10 includes a hybrid drive assembly 12 and a control system 14. The hybrid drive assembly 12 is adapted to selectively propel the vehicle 11 while the control system 14 is adapted to control the hybrid drive assembly 12.

The drive system 10 further includes one or more front wheels 16 and one or more rear wheels 18. A brake 20 is operably associated with each of the front and rear wheels 16, 18 of the drive system 10. The brakes 20 are adapted to selectively decrease the kinetic energy of the vehicle 11. In one aspect of the present disclosure, the brakes 20 are friction brakes. Non-limiting examples of friction brakes that are suitable for use in the drive system 10 include disc brakes, drum brakes, mechanically actuated brakes, hydraulically actuated brakes, pneumatically actuated brakes, electronically actuated brakes, or combinations thereof.

The hybrid drive assembly 12 of the drive system 10 includes a first power source, generally designated 22, and a second power source, generally designated 24. In the depicted example of FIG. 1, the second power source 24 is disposed in parallel to the first power source 22. In other examples, however, the second power source 24 can be disposed in series to the first power source 22.

The first power source 22 of the hybrid drive assembly 12 includes a conventional prime mover 26, such as an internal combustion engine. Generally, the prime mover 26 generates power in response to combustion of fuel. In one aspect of the present disclosure, the first power source 22 also includes a transmission 28, such as a conventional transmission unit.

When the second power source 24 is connected in parallel to the first power source 22, the transmission 28 directs the power from the prime mover 26 to at least one of wheels 16, 18 through a driveline 30.

In the depicted embodiment, the driveline 30 includes a front drive shaft 32, a rear drive shaft 34, left and right axle shafts 36, 38 and a differential 40. The differential 40 is disposed between the left and right axle shafts 36, 38. In the example shown, the left and right axle shafts 36, 38 connect the rear wheels 18 to the differential 40. In other embodiments, the driveline 30 can include axle shafts that connect the front wheels 16 to a differential.

Figure 2:
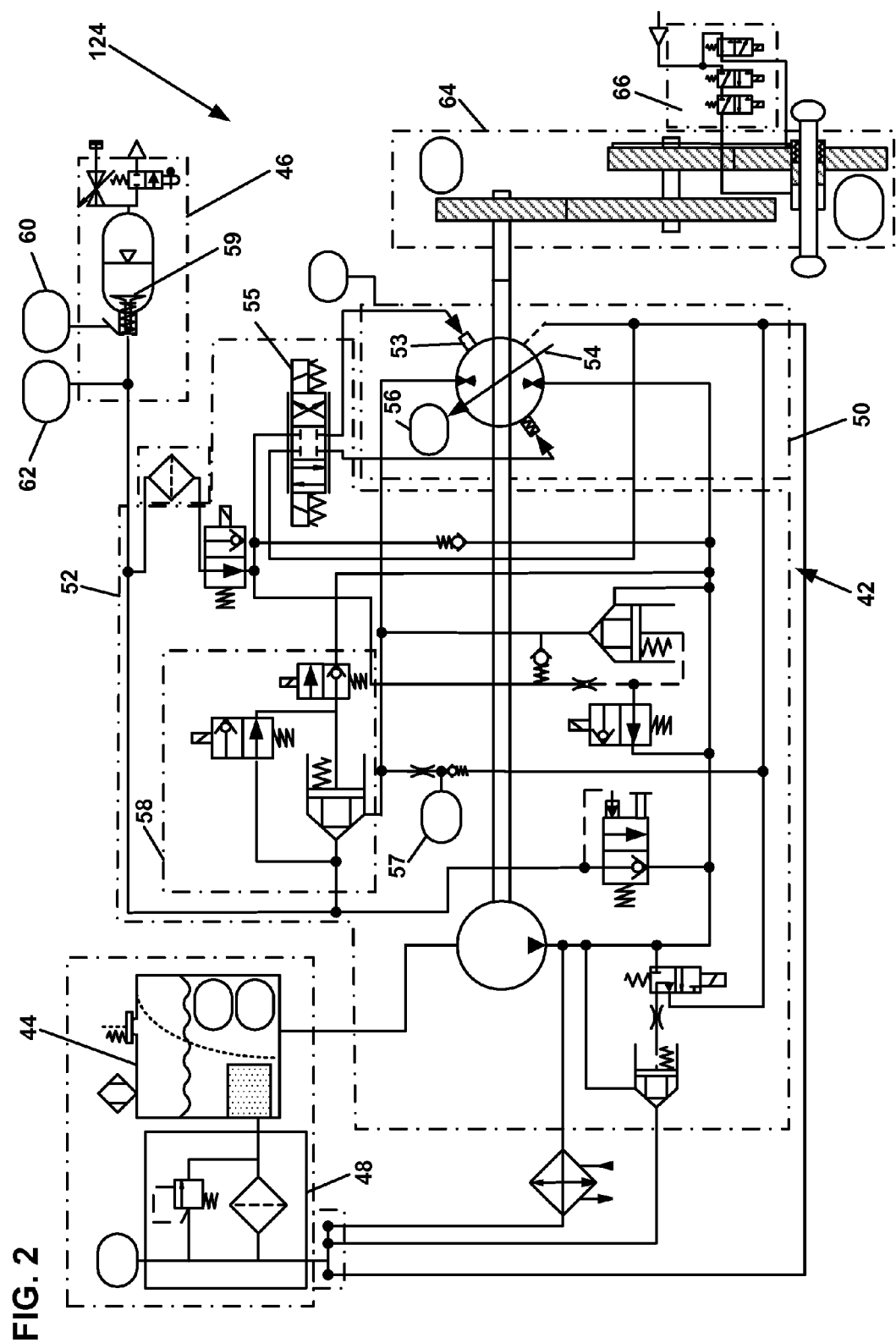
FIG. 2 is a schematic representation of a second power source of the drive system of FIG. 1.

Referring now to FIGS. 1 and 2, the second power source 24 is a hydraulic power source. In the depicted embodiment, the second power source 24 includes a pump-motor assembly 42, a fluid reservoir 44, and an energy storage unit 46. The second power source 24 also includes a system filter 48. The pump-motor assembly 42 includes a pump/motor unit 50 and an end cover assembly 52. The pump-motor assembly 42 is arranged in selective fluid communication with a fluid reservoir 44 and an energy storage unit 46.

The pump/motor unit 50 is of a variable displacement type. In the depicted embodiment, the pump/motor unit 50 is of the axial piston type (e.g., a variable displacement axial piston type). The pump/motor unit 50 includes a servo actuator 53 that is engaged to a variable swashplate 54. The servo actuator 53 is adapted to selectively adjust the angle of the swashplate 54, which adjusts the displacement of the pump/motor unit 50. The servo actuator 53 is adapted to move the swashplate 54 between full stroke for pumping and full stroke for motoring. In the depicted embodiment, the pump/motor unit 50 is biased to a neutral position. In the neutral position, the swashplate 54 is disposed between the full stroke position for pumping and the full stroke position for motoring.

The servo actuator 53 is in fluid communication with a swash control valve 55. The swash control valve 55 is a directional control valve that communicates fluid to the servo actuator 53 to adjust the position of the swashplate 54.

The pump/motor unit 50 further includes a swashplate position sensor 56. The swashplate position sensor 56 is adapted to provide a signal corresponding to the angular position of the swashplate 54 to the control system 14. In the depicted embodiment, the pump/motor unit 50 includes two swashplate position sensors 56.

A neutral pressure sensor 57 is in fluid communication with a fluid port of the pump/motor unit 50. The neutral pressure sensor 57 monitors the pressure of fluid from the pump/motor unit 50 to the energy storage unit 46 when the pump/motor unit 50 is in pumping mode and the pressure of fluid from the energy storage unit 46 to the pump/motor unit 50 when the pump/motor unit 50 is in motoring mode.

A mode valve assembly 58 is disposed between the pump/motor unit 50 and the energy storage unit 46. In one embodiment, the mode valve assembly 58 is disposed in the end cover assembly 52.

In the depicted embodiment, the mode valve assembly 58 includes a plurality of valves that can be actuated to allow fluid to flow from the pump/motor unit 50 to the energy storage unit 46 in pumping mode and to allow fluid to flow from the energy storage unit 46 to the pump/motor unit 50 in motoring mode. In addition, the mode valve assembly 58 can be actuated to allow fluid to flow from either the pump/motor unit 50 or the energy storage unit 46 to the fluid reservoir 44.

In the depicted embodiment, the energy storage unit 46 is an accumulator (e.g., a gas-charged accumulator, etc.). The energy storage unit 46 includes a foot valve 59 that is movable between an open position and a closed position. In one embodiment, the movement of the foot valve 59 is based on the pressure of the fluid in the energy storage unit 46. In another embodiment, the foot valve 59 is electronically actuated.

The energy storage unit 46 further includes a proximity sensor 60 and a high pressure sensor 62. The proximity sensor 60 monitors the position of the foot valve 59. The high pressure sensor 62 monitors the fluid pressure in the energy storage unit 46.

The second power source 24 further includes an engagement assembly 64. In the depicted embodiment, the engagement assembly 64 is disposed between the front and rear drive shafts 32, 34. The engagement assembly 64 is adapted to selectively engage the pump/motor unit 50 to the driveline 30. In one aspect of the present disclosure, the engagement assembly 64 includes a clutch configured to selectively engage the pump/motor unit 50 to the driveline 30. For example, the clutch can include a clutch valve 66. In another aspect of the present disclosure, the engagement assembly 64 includes a transfer case (see FIG. 2).

In one aspect of the present disclosure, the engagement assembly 64 is adapted to engage (e.g., via the clutch) the pump/motor unit 50 to the driveline 30 when the vehicle 11 decelerates. During deceleration, the pump/motor unit 50 is engaged with the driveline 30 and acts as a pump. The pump/motor unit 50 transfers (e.g., pumps) fluid from the fluid reservoir 44 to the energy storage unit 46. As the fluid is transferred to the energy storage unit 46, the pressure of the fluid in the energy storage unit 46 increases.

In another aspect of the present disclosure, the engagement assembly 64 is adapted to engage (e.g., via the clutch) the pump/motor unit 50 to the driveline 30 when the vehicle 11 accelerates. During acceleration, the pump/motor unit 50 is engaged with the driveline 30 and acts as a motor. The pump/motor unit 50 receives pressurized fluid from the energy storage unit 46, which results in the pump/motor unit 50 transmitting torque to the driveline 30. This torque generated from the pump/motor unit 50 and transmitted to the driveline 30 is used to propel the vehicle 11.

In other aspects, the second power source 24 is connected in series with the first power source 22 and the prime mover 26 is coupled to the pump/motor unit 50. The pump/motor unit 50 is in fluid communication with a motor assembly (not shown) that is coupled to the left and right axle shafts 36, 38.

The control system 14 includes a first power source control system 68 and a second power control system 70. The first power source control system 68 is adapted to control the first power source 22. The second power source controller 70 is adapted to control the second power source 24.

Figure 3:
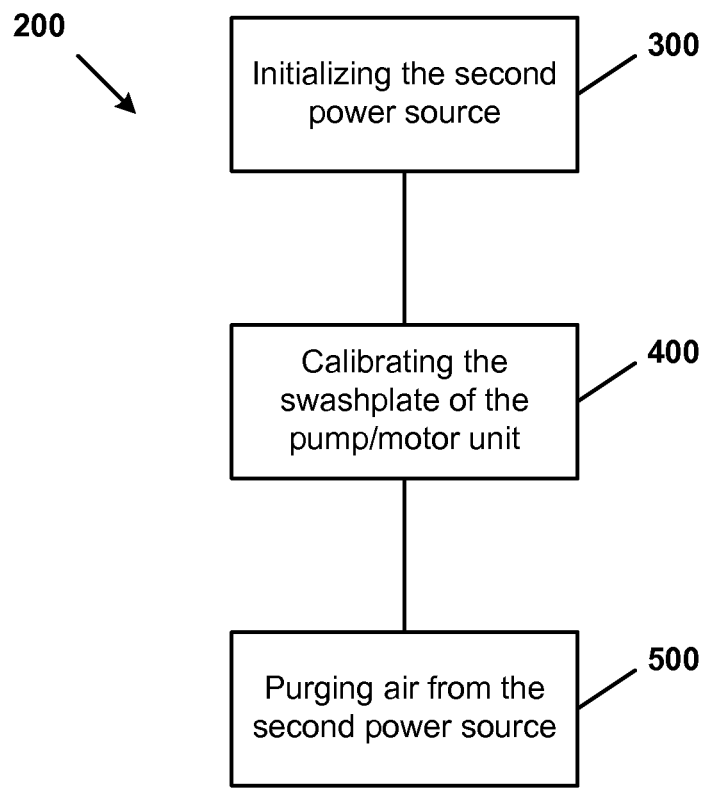
FIG. 3 is a flowchart illustrating an example method for commissioning a second power source of the hybrid vehicle.

Referring still to FIGS. 1-3, a method 200 for commissioning the second power source 24 will be described. In one embodiment, the vehicle 11 is commissioned using a chassis dynamometer. In another embodiment, the vehicle 11 is commissioned using a test track.

In the depicted embodiment, the method 200 for commissioning the second power source 24 includes three processes. The first process includes a method 300 for initializing the second power source 24. The second process includes a method 400 for calibrating the swashplate 54 of the pump/motor unit 50. The third process includes a method 500 for purging gas from the second power source 24.

Figure 4:
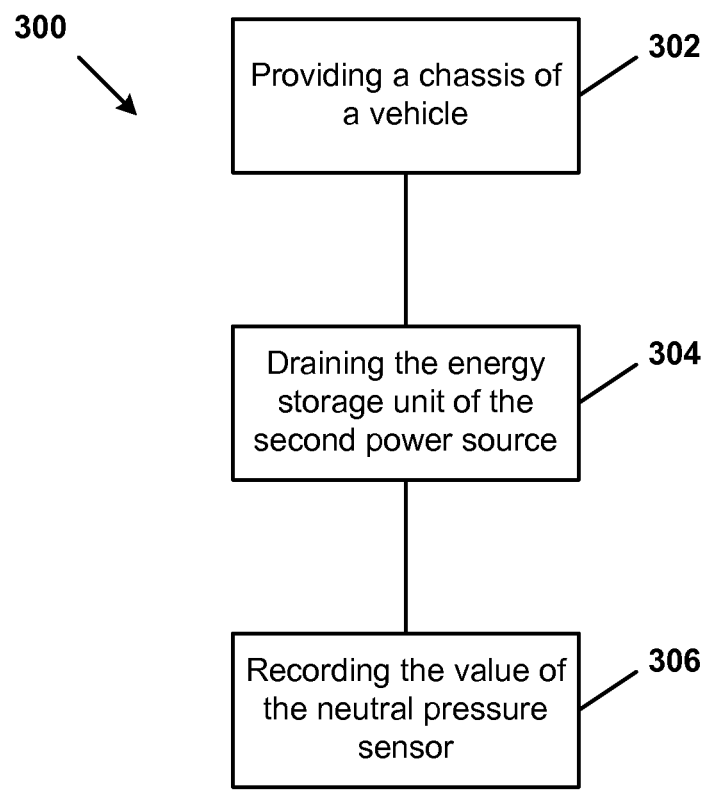
FIG. 4 is a flowchart illustrating an example method for initializing the second power source.

Referring now to FIG. 4, the method 300 for initializing the second power source 24 will be described. In step 302, a chassis of the vehicle 11 is provided. The first and second power sources 22, 24 are engaged to the chassis of the vehicle 11. In order to enable access to the second power source 24 during testing of the vehicle 11, a body of the vehicle 11 is not added to the chassis prior to testing.

With the swashplate 54 of the pump/motor unit 50 biased to the neutral position, the fluid in the energy storage unit 46 is drained in step 304. In the depicted embodiment, the second power source controller 70 actuates the mode valve assembly 58 so that fluid is communicated from the energy storage unit 46 to the fluid reservoir 44. The foot valve 59 opens to release the fluid stored in the energy storage unit 46.

With the swashplate 54 of the pump/motor unit 50 biased to the neutral position, the value from the neutral pressure sensor 57 is recorded in step 306. This value is recorded as a neutral pressure offset. In another embodiment, the neutral pressure sensor 57 is zeroed.

With the energy storage unit 46 drained and the value from the neutral pressure sensor 57 recorded, the method 400 for calibrating the swashplate 54 of the pump/motor unit 50 is initiated.

Figure 5:
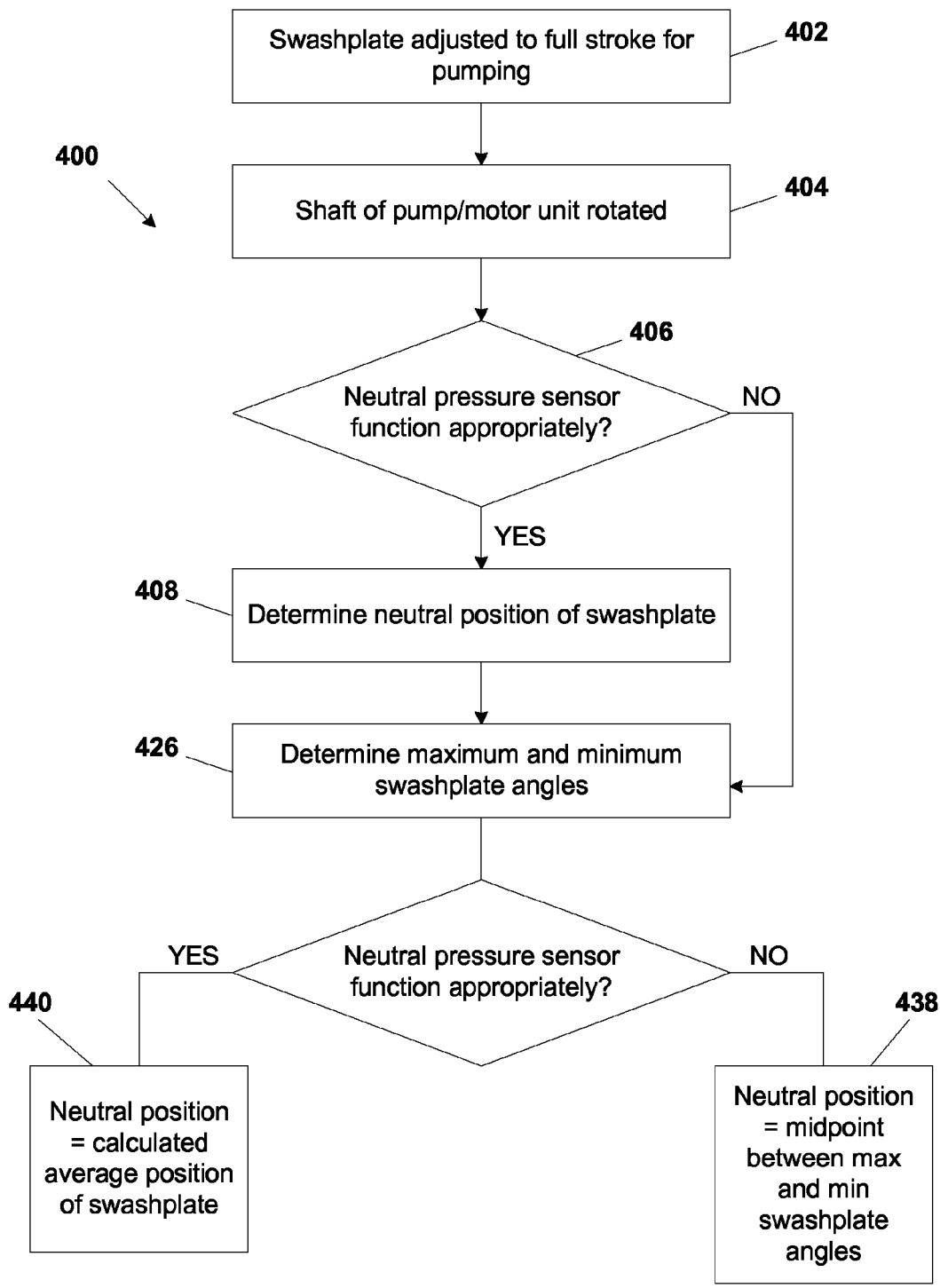
FIG. 5 is a flowchart illustrating an example method for calibrating a swashplate of a pump/motor unit of the second power source.
Figure 6:
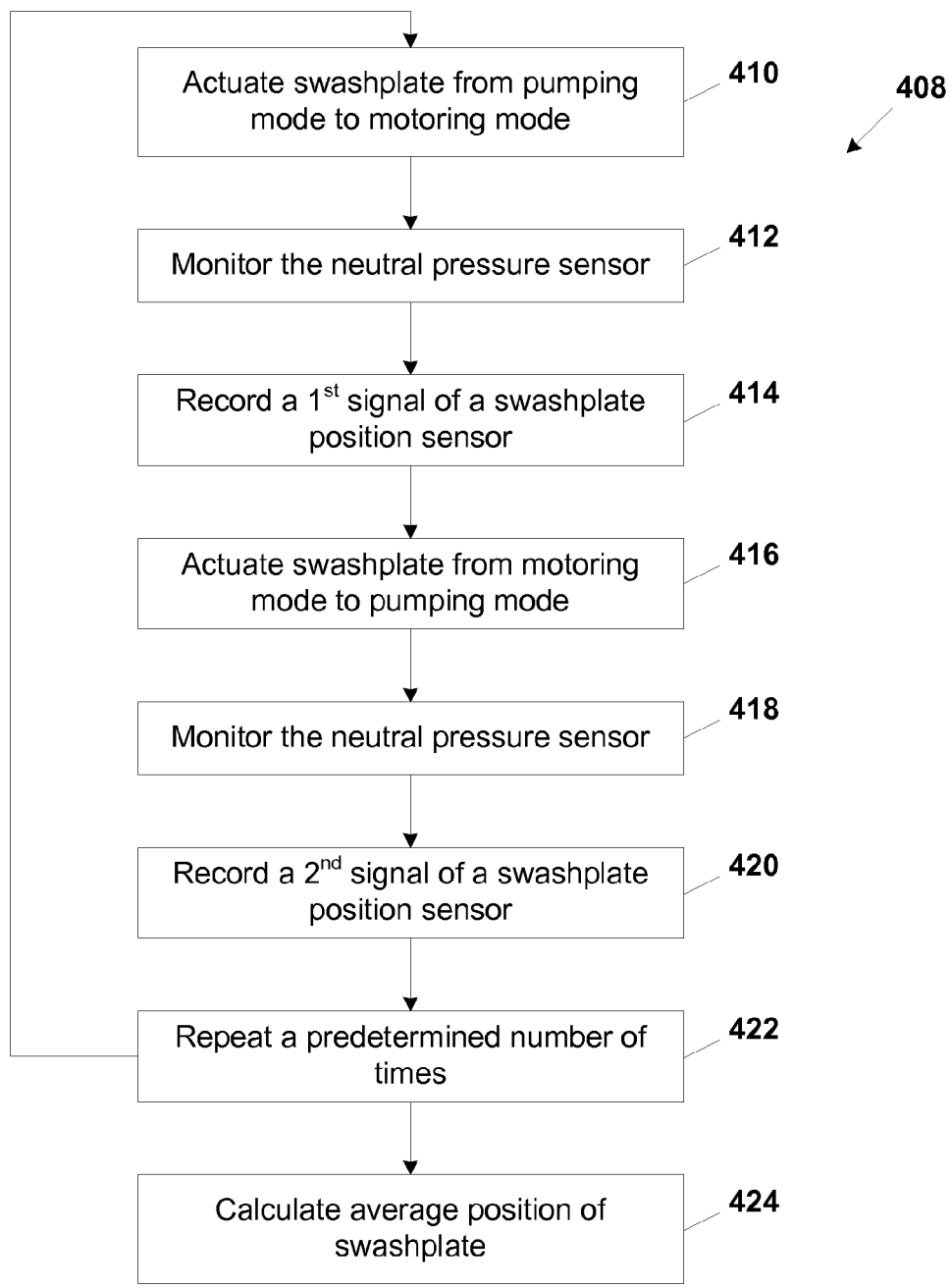
FIG. 6 is a flowchart illustrating an example method for determining the neutral position of the swashplate.
Figure 7:
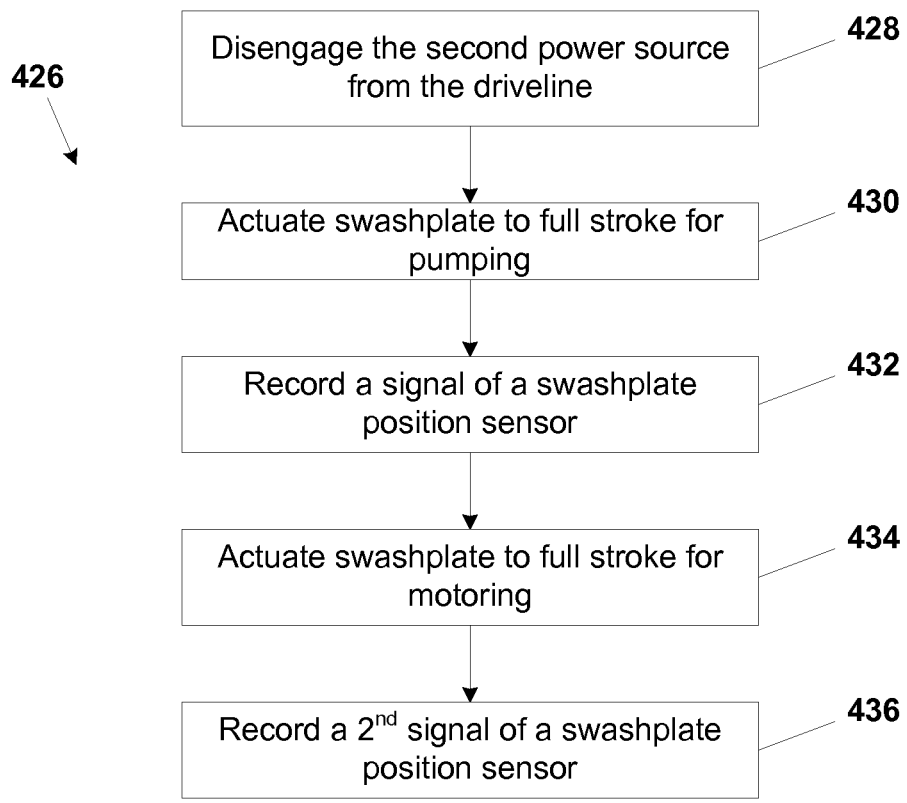
FIG. 7 is a flowchart illustrating an example method for determining maximum and minimum stroke angles of the swashplate of the pump/motor unit.
Figure 8:
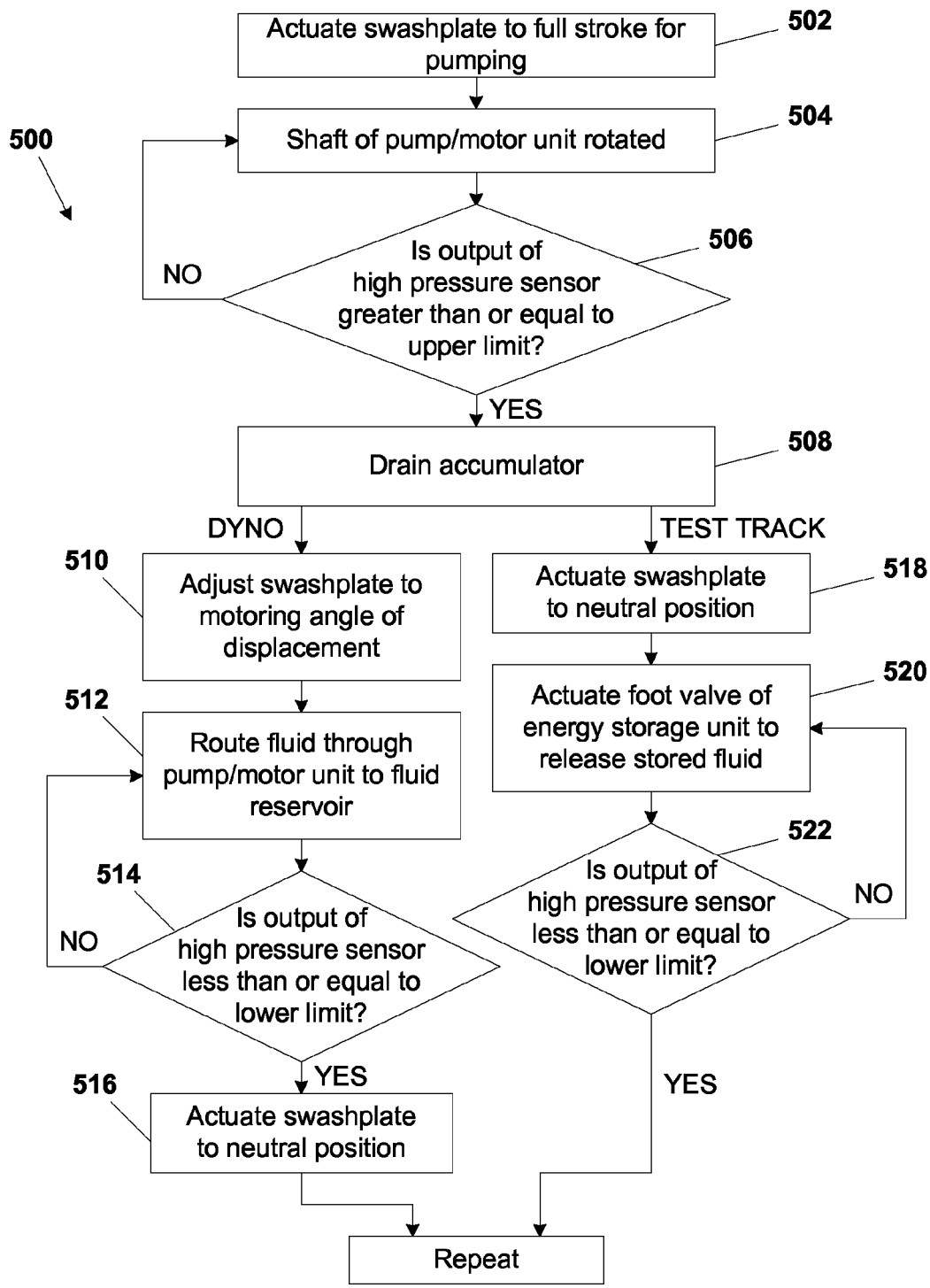
FIG. 8 is a flowchart illustrating an example method for purging gas from the second power source.

Referring now to FIG. 5, the method 400 for calibrating the swashplate 54 of the pump/motor unit 50 will be described. In step 402, the second power source controller 70 actuates the servo actuator 53 of the pump/motor unit 50 so that the swashplate 54 is adjusted from the neutral position to full stroke for pumping.

With swashplate 54 of the pump/motor unit 50 adjusted to full stroke for pumping, a shaft 74 of the pump/motor unit 50 is rotated so that fluid is pumped from the fluid reservoir 44 to the energy storage unit 46 in step 404. In the depicted embodiment, the driveline 30 is coupled to the shaft 74 of the pump/motor unit 50 to rotate the shaft 74 of the pump/motor unit 50. In the depicted embodiment, the driveline 30 is also coupled to the first power source 22 so that the first power source 22 rotates the driveline 30. As the first power source 22 rotates the driveline 30, the first power source 22 is being used in this method 400 to rotate the shaft 74 of the pump/motor unit 50. In the depicted embodiment, the first power source 22 is used to drive the second power source 24 since the vehicle does not include a body. Since the vehicle doesn't include a body, the weight of the vehicle is substantially reduced as compared to a fully assembled vehicle. With the vehicle having a low weight, deceleration of the vehicle does not result in adequate torque to pressurize the energy storage unit 46. Therefore, the first power source 22 is used to drive the pump/motor unit 50 in order to pressurize the energy storage unit 46 rather than relying solely on the vehicle deceleration.

In step 406, the neutral pressure sensor 57 is evaluated. In one embodiment, values from the neutral pressure sensor 57 are compared to determine whether the pressure of the fluid at the outlet of the pump/motor unit 50 is increasing as the shaft 74 of the pump/motor unit 50 rotates. If subsequent values from the neutral pressure sensor 57 increase as the shaft 74 of the pump/motor unit 50 rotates, the neutral pressure sensor 57 is functioning appropriately. If subsequent values from the neutral pressure sensor 57 do not increase, the neutral pressure sensor 57 is not functioning appropriately. If the neutral pressure sensor 57 is functioning appropriately, a neutral position of the swashplate 54 is determined in step 408.

Referring now to FIGS. 1, 2, 5 and 6, the method 408 for determining the neutral position of the swashplate 54 will be described. In step 410, the second power source controller 70 commands the swash control valve 55 to actuate the servo actuator 53 to move the swashplate 54 from pumping mode to motoring mode. As the swashplate 54 moves from pumping mode to motoring mode, the swashplate 54 passes through the neutral position. This method 408 is adapted to at least approximate the neutral position during this transition.

In one embodiment, the swashplate 54 is moved to full stroke for motoring. In another embodiment, the swashplate 54 is moved to a position between the neutral position and the full stroke position for motoring. In another embodiment, the swashplate 54 is moved to a position greater than or equal to about 1 degree of stroke. In another embodiment, the swashplate 54 is moved to a position greater than or equal to about 2 degrees of stroke. In another embodiment, the swashplate 54 is moved to a position greater than or equal to about 4 degrees of stroke. In another embodiment, the swashplate 54 is moved to a position greater than or equal to about 10 degrees of stroke.

As the swashplate 54 of the pump/motor unit 50 is adjusted to motoring mode, the neutral pressure sensor 57 is monitored in step 412. In step 414, a first signal from the swashplate position sensor 56 is recorded when the neutral pressure sensor 57 outputs a value that crosses a threshold value as the servo actuators 53 move the swashplate 54 to motoring mode. In one embodiment, the threshold value corresponds to pressure at the fluid outlet of the pump/motor unit 50 that is less than a lower limit. In one embodiment, the lower limit is less than or equal to about 50 psi. In another embodiment, the lower limit is less than or equal to about 25 psi. In another embodiment, the lower limit is less than or equal to about 10 psi. In another embodiment, the lower limit includes the neutral pressure offset recorded in step 306 above. The first signal from the swashplate position sensor 56 corresponds to a first value (or approximation) of the neutral position of the swashplate 54.

After the first signal from the swashplate position sensor 56 is recorded, the second power source controller 70 commands the swash control valve 55 to actuate the servo actuator 53 to move the swashplate from motoring mode to pumping mode in step 416.

In one embodiment, the swashplate 54 is moved to full stroke for pumping. In another embodiment, the swashplate 54 is moved to a position between the neutral position and the full stroke position for pumping. In another embodiment, the swashplate 54 is actuated to a position greater than or equal to about 1 degree of stroke. In another embodiment, the swashplate 54 is actuated to a position greater than or equal to about 2 degrees of stroke. In another embodiment, the swashplate 54 is actuated to a position greater than or equal to about 4 degrees of stroke. In another embodiment, the swashplate 54 is actuated to a position greater than or equal to about 10 degrees of stroke.

As the swashplate 54 of the pump/motor unit 50 is adjusted to pumping mode, the neutral pressure sensor 57 is monitored in step 418. In step 420, a second signal from the swashplate position sensor 56 is recorded when the neutral pressure sensor 57 outputs a value that crosses a threshold value as the servo actuators 53 move the swashplate 54 to pumping mode. In one embodiment, the threshold value corresponds to pressure at the fluid outlet of the pump/motor unit 50 that is less than the lower limit. This second signal corresponds to a second value for the neutral position of the swashplate 54

In step 422, steps 410 through 420 are repeated a number of times in order to capture more values corresponding to the neutral position of the swashplate 54. The more values that are captured, the greater the accuracy of the neutral position determination. In one embodiment, steps 410 through 420 are repeated at least one time. In another embodiment, steps 410 through 420 are repeated at least two times. In another embodiment, steps 410 through 420 are repeated at least 3 times. In step 424, an average value corresponding to the neutral position of the swashplate 54 is calculated using the values captured during steps 410 through 422. In step 424, the values captured during steps 410 through 422 are summed and divided by the total number of values.

Referring now to FIGS. 1, 2, 5 and 7, if the neutral pressure sensor 57 is not functioning appropriately or if the neutral position of the swashplate 54 has been calculated, the maximum and minimum angles for the swashplate 54 are determined in step 426. In step 428, the second power source 24 is disengaged from the driveline 30.

In step 430, the second power source controller 70 commands the swash control valve 55 to actuate the servo actuator 53 to move the swashplate 54 to full stroke for pumping. In step 432, a signal from the swashplate position sensor 56 is recorded when the swashplate 54 reaches full stroke.

In step 434, the second power source controller 70 commands the swash control valve 55 to actuate the servo actuator 53 to move the swashplate 54 to full stroke for motoring. In step 436, a signal from the swashplate position sensor 56 is recorded when the swashplate 54 reaches full stroke.

In step 438, the full stroke values for pumping and motoring modes of the pump/motor unit 50 is used to approximate the neutral position of the swashplate 54 if the neutral pressure sensor 57 is not functioning appropriately. In step 438, the neutral position of the swashplate 54 is approximated to be the mid-point between the full stroke value for pumping and the full stroke value for motoring. In step 440, the neutral position of the swashplate 54 is approximated to be the average value calculated in step 426.

The full stroke values for pumping and motoring modes can also be used by the second power source controller 70 as control limits during normal operation of the second power source 24. For example, during actuation of the swashplate 54, the swashplate angle may be limited to a value less than the full stroke value in order to prevent swashplate 54 from hitting the mechanical stop in the pump/motor unit 50.

Referring now to FIGS. 1, 2, 3 and 8, the method 500 for purging gas from the second power source 24 will be described. In step 502 of the method 500, the second power source controller 70 commands the swash control valve 55 to actuate the servo actuator 53 to move the swashplate 54 to full stroke for pumping. With swashplate 54 of the pump/motor unit 50 adjusted to full stroke for pumping, the shaft 74 of the pump/motor unit 50 is rotated so that fluid is pumped from the fluid reservoir 44 to the energy storage unit 46 in step 504. In the depicted embodiment, the driveline 30 is coupled to the shaft 74 of the pump/motor unit 50 to rotate the shaft 74 of the pump/motor unit 50. In the depicted embodiment, the driveline 30 is also coupled to the first power source 22 so that the first power source 22 rotates the driveline 30. As the first power source 22 rotates the driveline 30, the first power source 22 is being used in this method 500 to rotate the shaft 74 of the pump/motor unit 50. In the depicted embodiment, the first power source 22 is used to drive the second power source 24 since the vehicle does not include a body.

In step 506, an output of the high pressure sensor 62 of the energy storage unit 46 is compared to an upper limit. When the output of the high pressure sensor 62 is greater than or equal to the upper limit, the fluid stored in the energy storage unit 46 is drained in step 508.

If the vehicle 11 is being commissioned on a chassis dynamometer, the second power source controller 70 commands the swash control valve 55 to actuate the servo actuator 53 to move the swashplate 54 to a motoring angle of displacement in step 510. As the vehicle 11 does not include a body on the chassis, the position of the swashplate 54 is limited to prevent excessive torque and/or acceleration. In step 512, the fluid stored in the energy storage unit 46 is communicated through the pump/motor unit 46 to the fluid reservoir 44. As the fluid from the energy storage unit 46 is communicated to the pump/motor unit 46, the output from the high pressure sensor 62 of the energy storage unit 46 is compared to a lower limit in step 514. When the output of the high pressure sensor 62 is less than or equal to the lower limit, the swashplate 54 of the pump/motor unit 46 is actuated to the neutral position in step 516.

If the vehicle is being commissioned on a test track, the second power source controller 70 commands the swash control valve 55 so that the swashplate 54 is disposed in the neutral position in step 518. With the swashplate 54 of the pump/motor unit 50 biased to the neutral position, the second power source controller 70 actuates the mode valve assembly 58 so that fluid is communicated from the energy storage unit 46 to the fluid reservoir 44 in step 520 and the foot valve 59 opens to release the fluid stored in the energy storage unit 46.

As the fluid from the energy storage unit 46 is communicated to the pump/motor unit 46, the output from the high pressure sensor 62 of the energy storage unit 46 is compared to a lower limit in step 522. When the output of the high pressure sensor 62 is less than or equal to the lower limit, the foot valve 59 is actuated to the closed position in step 524.

In one embodiment, the method 500 is repeated a number of times in order to ensure that gas is purged from the system. In one embodiment, the method 500 is repeated at least two times. In another embodiment, the method 500 is repeated at least five times. In another embodiment, the method 500 is repeated at least ten times.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A method for commissioning a hybrid vehicle comprising:
    providing a vehicle having:
        a chassis;
        a first power source disposed on the chassis, the first power source including a prime mover and a transmission, wherein the prime mover is selectively engaged to a driveline of the vehicle;
        a second power source disposed on the chassis, the second power source including a pump/motor assembly, the pump/motor assembly including a pump/motor unit having a variable swash plate and a servo actuator, a fluid reservoir in fluid communication with the pump/motor assembly, and an energy storage unit in fluid communication with the pump/motor assembly;
    determining a neutral position of the pump/motor assembly, wherein the neutral position corresponds to an average of the recorded signals, the neutral position determination step includes:
        actuating the pump/motor unit from pumping mode to motoring mode;
        monitoring a signal from a neutral pressure sensor that is in fluid communication with the pump/motor unit;
        recording the signal from the neutral pressure sensor when the signal crosses a threshold value;
        actuating the pump/motor unit from motoring mode to pumping mode;
        monitoring the signal from the neutral pressure sensor; and
        recording the signal when the signal crosses the threshold value, wherein the pump/motor assembly of the second power source is coupled to the prime mover of the first power source during pumping mode of the pump/motor assembly; and purging gas from the second power source by routing fluid from the energy storage unit to the fluid reservoir.

2. The method of claim 1, wherein the threshold value includes a neutral pressure offset value.

3. The method of claim 1, wherein the neutral position determination step includes:
actuating the pump/motor unit to full stroke for pumping;
recording a signal from a swashplate position sensor when the swashplate is at a full stroke position for pumping;
actuating the pump/motor unit to full stroke for motoring; and
recording the signal from the swashplate position sensor when the swashplate is at a full stroke position for motoring.

4. The method of claim 3, wherein the neutral position corresponds to a position halfway between the full stroke positions for pumping and motoring.

5. The method of claim 3, wherein the second power source is disengaged from the driveline.

6. The method of claim 1, wherein the step of purging gas from the second power source includes:
actuating the swashplate of the pump/motor unit to a position between the neutral position and full stroke for motoring; and
routing fluid from the energy storage unit to the fluid reservoir through the pump/motor unit.

7. The method of claim 6, wherein the position of the swashplate is limited to a position less than full stroke for motoring.

8. The method of claim 1, wherein the step of purging the gas from the second power source includes:
routing fluid from the energy storage unit to the fluid reservoir, wherein the fluid bypasses the pump/motor unit.

9. The method of claim 8, wherein the fluid is routed through a mode valve assembly that is disposed between the energy storage unit and the pump/motor unit.

10. A method for commissioning a hybrid vehicle comprising:
providing a vehicle having:
a chassis;
a first power source disposed on the chassis, the first power source including a prime mover and a transmission, wherein the prime mover is selectively engaged to a driveline of the vehicle; and
a second power source disposed on the chassis, the second power source including a pump/motor assembly having a pump/motor unit with a variable swashplate, a fluid reservoir in fluid communication with the pump/motor assembly, and an energy storage unit in fluid communication with the pump/motor assembly;
determining a neutral position of the pump/motor unit, wherein the pump/motor unit of the second power source is coupled to the prime mover of the first power source during pumping mode, the neutral position determination including:
actuating the pump/motor unit from pumping mode to motoring mode;
monitoring a signal from a neutral pressure sensor that is in fluid communication with the pump/motor unit;
recording the signal from the neutral pressure sensor when the signal crosses a threshold value;
actuating the pump/motor unit from motoring mode to pumping mode;
monitoring the signal from the neutral pressure sensor; and
recording the signal when the signal crosses the threshold value;
wherein the neutral position corresponds to an average of the recorded signals.

11. The method of claim 10, further comprising purging gas from the second power source by:
actuating the swashplate of the pump/motor unit to a position between the neutral position and full stroke for motoring; and
routing fluid from the energy storage unit to the fluid reservoir through the pump/motor unit.

12. The method of claim 11, wherein the position of the swashplate during the step of purging gas from the second power source is limited to a position less than full stroke for motoring.

13. The method of claim 10, further comprising purging gas from the second power source by routing fluid from the energy storage unit to the fluid reservoir, wherein the fluid bypasses the pump/motor unit.

14. The method of claim 10, further comprising calibrating the swashplate position by:
actuating the pump/motor unit to full stroke for pumping;
recording a signal from a swashplate position sensor when the swashplate is at a full stroke position for pumping;
actuating the pump/motor unit to full stroke for motoring; and
recording the signal from the swashplate position sensor when the swashplate is at a full stroke position for motoring.

15. The method of claim 14, wherein the second power source is disengaged from the driveline during the calibration of the swashplate.

16. A method for commissioning a hybrid vehicle comprising:
providing a vehicle having:
a chassis;
a first power source disposed on the chassis, the first power source including a prime mover and a transmission, wherein the prime mover is selectively engaged to a driveline of the vehicle;
a second power source disposed on the chassis, the second power source including a pump/motor assembly, a fluid reservoir in fluid communication with the pump/motor assembly, and an energy storage unit in fluid communication with the pump/motor assembly;
determining a neutral position of the pump/motor assembly, wherein the pump/motor assembly of the second power source is coupled to the prime mover of the first power source during pumping mode of the pump/motor assembly; and
purging gas from the second power source while the pump/motor assembly is in the neutral position by routing fluid from the energy storage unit to the fluid reservoir; wherein a foot valve in the energy storage unit opens to route fluid stored in the energy storage unit.

* * * * *